US009933277B2

(12) United States Patent
Terauchi

(10) Patent No.: US 9,933,277 B2
(45) Date of Patent: Apr. 3, 2018

(54) TEST INDICATOR

(71) Applicant: MITUTOYO CORPORATION, Kawasaki-shi, Kanagawa (JP)

(72) Inventor: Tatsushi Terauchi, Nakatsugawa (JP)

(73) Assignee: MITUTOYO CORPORATION, Kawasaki-shi (JP)

(*) Notice: Subject to any disclaimer, the term of this patent is extended or adjusted under 35 U.S.C. 154(b) by 158 days.

(21) Appl. No.: 15/006,243

(22) Filed: Jan. 26, 2016

(65) Prior Publication Data
US 2016/0231150 A1 Aug. 11, 2016

(30) Foreign Application Priority Data

Feb. 9, 2015 (JP) .................................. 2015-023201

(51) Int. Cl.
G01B 21/00 (2006.01)
G01D 5/04 (2006.01)
G01B 21/04 (2006.01)
G01B 5/28 (2006.01)

(52) U.S. Cl.
CPC ................ G01D 5/04 (2013.01); G01B 5/28 (2013.01); G01B 5/285 (2013.01); G01B 21/045 (2013.01)

(58) Field of Classification Search
CPC ........ G01B 21/045; G01B 5/28; G01B 5/285; G01D 5/04
USPC .................................................... 33/502, 503
See application file for complete search history.

(56) References Cited

U.S. PATENT DOCUMENTS

| 5,131,166 A * | 7/1992 | Weber ..................... G01B 5/004 33/1 M |
| 5,148,377 A * | 9/1992 | McDonald ........... G01B 5/0025 33/503 |
| 6,304,825 B1 * | 10/2001 | Nowak ................ G03G 21/145 340/870.32 |
| 8,943,703 B2 * | 2/2015 | Hayashida ............... G01B 3/22 33/505 |
| 9,016,122 B2 * | 4/2015 | Arai ....................... G01D 11/24 73/431 |
| 9,103,645 B2 * | 8/2015 | Hayashi ............... G01B 21/047 |
| D747,988 S * | 1/2016 | Matsumiya .................. D10/102 |
| 9,285,201 B2 * | 3/2016 | Matsumiya ............. G01B 7/34 |
| 9,291,442 B2 * | 3/2016 | Hidaka ..................... G01B 5/20 |

(Continued)

FOREIGN PATENT DOCUMENTS

JP 2008-309687 A 12/2008

Primary Examiner — Yaritza Guadalupe-McCall
(74) Attorney, Agent, or Firm — Oliff PLC

(57) ABSTRACT

There is provided a test indicator with which a correct measurement value can be easily obtained. A test indicator includes a gauge head including a contact ball at a tip end, a body case which pivotally supports the gauge head, and a rotary encoder which detects a rotation displacement amount of the gauge head. The test indicator further includes a correction unit which corrects a measurement value according to an angle θ between a measurement target surface W and the gauge head. The correction unit includes an angle memory which stores the angle θ between the measurement target surface W and the gauge head, a correction coefficient calculation unit which calculates a correction coefficient according to the angle θ, and a correction arithmetic unit which multiplies, by the correction coefficient, a displacement amount of the contact ball based on a detection value by the rotary encoder.

4 Claims, 7 Drawing Sheets

(56) References Cited

U.S. PATENT DOCUMENTS

| | | | | |
|---|---|---|---|---|
| 9,377,283 B2* | 6/2016 | Abe | .................... | G01B 21/04 |
| 9,518,811 B2* | 12/2016 | Yamamoto | ............ | G01B 3/008 |
| D790,379 S * | 6/2017 | Matsumiya | ................ | D10/85 |
| D792,251 S * | 7/2017 | Matsumiya | ................ | D10/70 |
| 2007/0132423 A1* | 6/2007 | Ajima | ................ | H02P 6/10 |
| | | | | 318/719 |
| 2009/0235546 A1* | 9/2009 | Klepp | ................ | G01B 3/26 |
| | | | | 33/502 |
| 2011/0218763 A1* | 9/2011 | Sakurada | ............ | B23Q 17/20 |
| | | | | 702/167 |
| 2012/0109562 A1* | 5/2012 | Yabuguchi | .......... | G01D 5/2046 |
| | | | | 702/87 |
| 2013/0099719 A1* | 4/2013 | Shibata | .............. | G01B 21/04 |
| | | | | 318/619 |
| 2013/0132026 A1* | 5/2013 | Lippuner | ............ | G01B 21/045 |
| | | | | 702/151 |
| 2015/0002659 A1* | 1/2015 | Atwell | ................ | G01B 5/008 |
| | | | | 348/135 |
| 2015/0107125 A1* | 4/2015 | Desforges | ........... | G01B 21/047 |
| | | | | 33/503 |
| 2016/0231150 A1* | 8/2016 | Terauchi | ............ | G01B 21/045 |

* cited by examiner

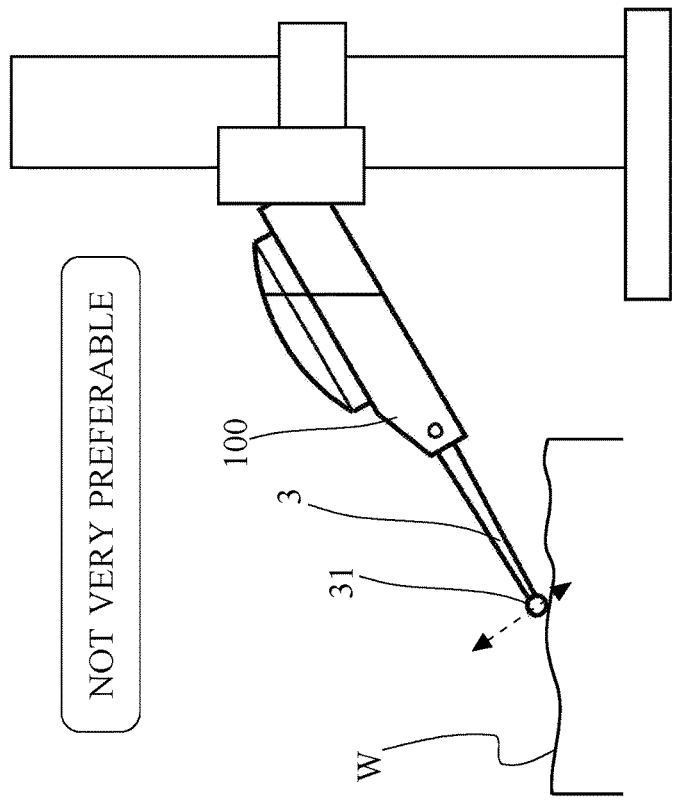
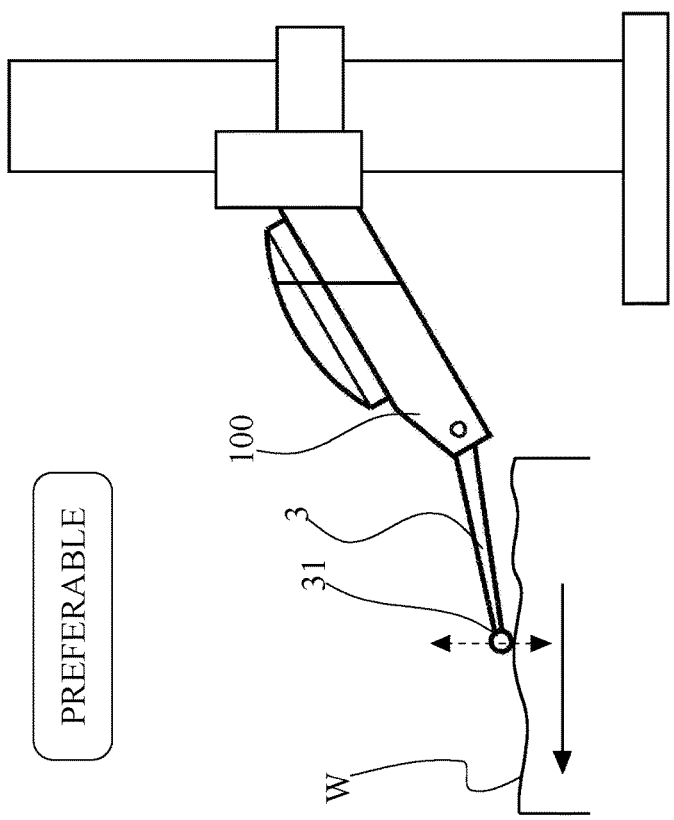
Fig. 2A
Fig. 2B

TEST INDICATOR

INCORPORATION BY REFERENCE

This application is based upon and claims the benefit of priority from Japanese patent application No. 2015-023201, filed on Feb. 9, 2015, the disclosure of which are incorporated herein in its entirety by reference.

BACKGROUND OF THE INVENTION

1. Field of the Invention

The present invention relates to a test indicator.

2. Description of Related Art

There has been known a test indicator (called as a lever type dial gauge) (for example, JP 2008-309687 A). A test indicator is used to measure a minute displacement, such as circumferential deflection, total deflection, flatness, and parallelism, and for a precise comparison inspection, such as a machining error of a machined product with respect to a master work (or a block gauge).

A test indicator 100 includes a gauge head 3 rotatably supported about an axis by the body case. The gauge head 3 includes a contact ball 31 at the tip end thereof. Then, the displacement of the contact ball 31 is increased using the principle of lever. Thus, the test indicator 100 is a measurement device having high precision and high resolution.

Due to the structural character that the displacement (rotation displacement) of the gauge head 3 which rotates around the rotation axis is increased using the principle of lever, there is a point of attention when the test indicator 100 is to be used.

That is, the gauge head 3 needs to be parallel to a measurement target surface W as much as possible to perform measurement.

For example, the flatness of the measurement target surface W is to be measured. In this case, while the contact ball 31 is being in contact with the measurement target surface W, both are relatively moved. However, in order to correctly measure the unevenness (or roughness) of the measurement target surface W, the measurement target surface W is to be substantially parallel to the gauge head 3, and the angle between the measurement target surface W and the gauge head 3 to be substantially zero as illustrated in FIG. 1A. When the measurement is performed as illustrated in FIG. 1A, the displacement direction of the contact ball 31 coincides with the unevenness direction of the measurement target surface W to be measured. (The displacement direction of the contact ball is the normal line direction of the measurement target surface.)

On the other hand, when the gauge head 3 is not parallel to the measurement target surface W and the angle θ between the measurement target surface W and the gauge head 3 is large as illustrated in FIG. 1B, the displacement direction of the contact ball 31 does not coincide with the unevenness direction of the measurement target surface W.

(The displacement direction of the contact ball 31 is inclined with respect to the normal line direction of the measurement target surface W.)

In this case, the measurement value does not correctly reflect the unevenness of the measurement target surface W.

If (for some reasons) the test indicator 100 needs to be installed as illustrated in FIG. 1B, the unevenness of the measurement target surface W can be obtained by correcting the measurement value according to the angle θ.

Note that, the inclination of the test indicator 100 itself does not matter. As illustrated in FIG. 2A, although the test indicator itself is inclined with respect to the measurement target surface W, the gauge head 3 is only required to be substantially parallel to the measurement target surface W.

SUMMARY OF THE INVENTION

As a first problem, a user who uses a test indicator may not understand or may forget the above point of attention.

If the user simply trusts the value displayed at the display unit of the test indicator, the user cannot obtain the correct measurement result.

As a second problem, although a user understands the necessity, the user may perform measurement without the correction according to the angle θ in practice.

If (for some reasons) the test indicator needs to be installed as illustrated in FIG. 1B, the correct value can be obtained by correcting the measurement value according to the angle θ. The method for the correction has been known.

However, in practical, the correction according to the angle θ is not performed sometimes.

Although the reason cannot be definitely explained, it may be much troublesome to correct individual measurement values one by one. Alternatively, a user may not understand the importance while understanding the necessity. For example, although a gap between a measurement value (display value) and a true value can be about twice when the angle θ is 50° or 60°, the user may not be aware of the gap.

Furthermore, a user may feel inconvenience in using the test indicator if a correction operation is required in addition to a measurement operation.

A purpose of the present invention is to provide a test indicator with which a correct measurement value can be easily obtained.

A test indicator of an exemplary embodiment of the present invention includes:

a gauge head including a contact ball at a tip end;

a body case configured to pivotally support the gauge head;

a rotary encoder configured to detect a rotation displacement amount of the gauge head;

a display unit configured to display a measurement value based on a detection value by the rotary encoder; and a correction unit configured to correct the measurement value according to an angle θ between a measurement target surface and the gauge head.

In an exemplary embodiment of the present invention, the correction unit preferably includes:

an angle memory configured to store the angle θ between the measurement target surface and the gauge head;

a correction coefficient calculation unit configured to calculate a correction coefficient according to the angle θ; and a correction arithmetic unit configured to multiply, by the correction coefficient, a displacement amount of the contact ball based on the detection value by the rotary encoder.

In an exemplary embodiment of the present invention, the display unit preferably displays a message for a user to input the angle θ between the measurement target surface and the gauge head.

In an exemplary embodiment of the present invention, an angle scale is preferably provided around a rotation axis of the gauge head on a side surface of the test indicator.

BRIEF DESCRIPTION OF THE DRAWINGS

FIGS. 2A and 2B are diagrams illustrating examples of positional relation between the test indicator and the measurement target surface;

DETAILED DESCRIPTION

Figure 1A:
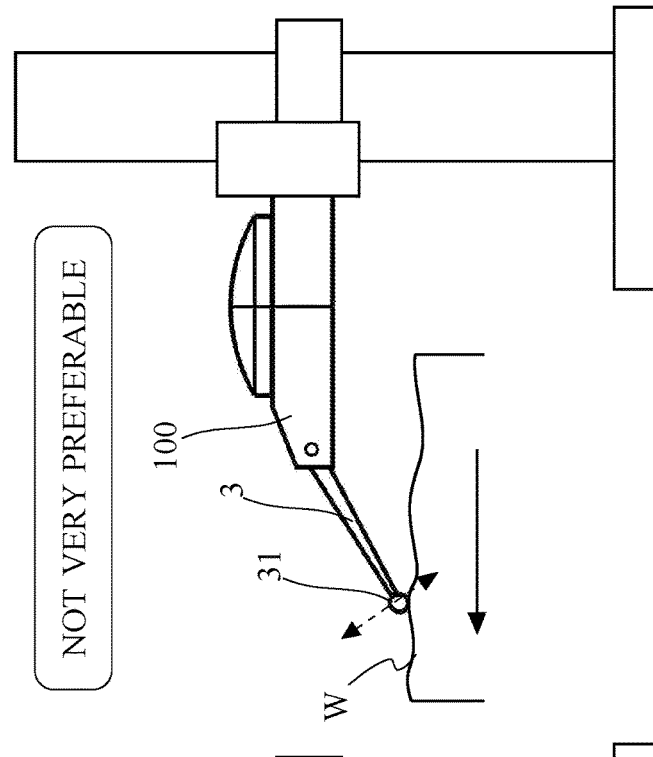
FIGS. 1A and 1B are diagrams illustrating examples of positional relation between a test indicator and a measurement target surface.
Figure 1B:
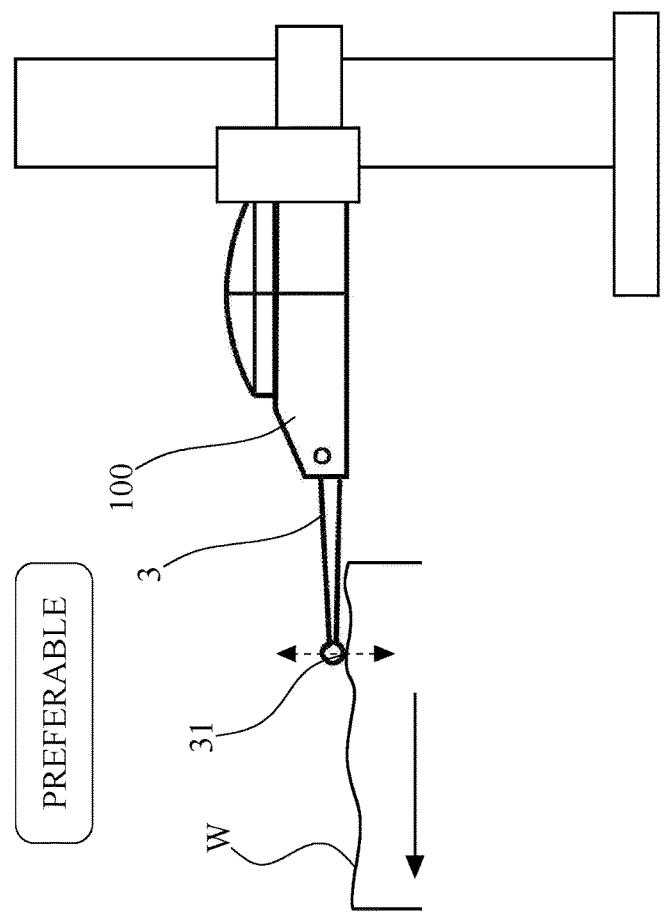

Exemplary embodiments of the present invention will be illustrated and described with reference to reference signs assigned to elements in the drawings.

First Exemplary Embodiment

A test indicator itself has been well known, but will be briefly described.

Figure 3:
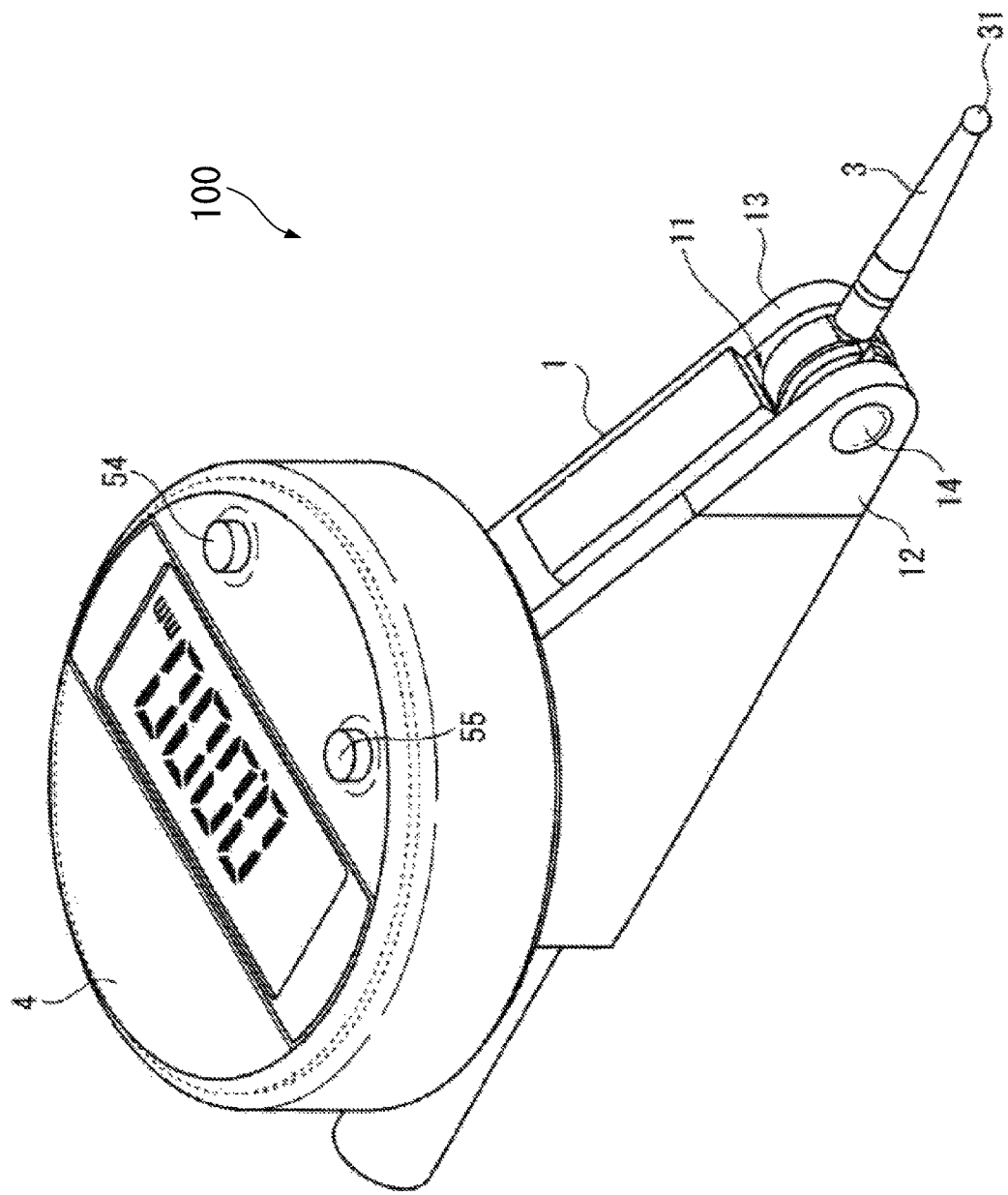
FIG. 3 is an external view of the test indicator.

FIG. 3 is an external view of a test indicator of the present exemplary embodiment.

A test indicator 100 includes a body case 1, a gauge head 3 rotatably supported by the body case 1, and a display unit 4 which digitally displays a rotation displacement amount of the gauge head 3.

The gauge head 3 is supported about an axis by bearing members 14 formed on bearings 12 and 13 of the body case 1 while being exposed from an insertion hole 11 formed at the body case 1. The gauge head 3 includes a contact ball 31 at a tip end thereof. The display unit 4 is formed in a flat disc shape and fixed to the body case 1. On the display unit, two switches (input units) 54 and 55 are disposed. These switches 54 and 55 are provided for input of various commands or setting values in addition to ON/OFF of the power and display changing.

Figure 4:
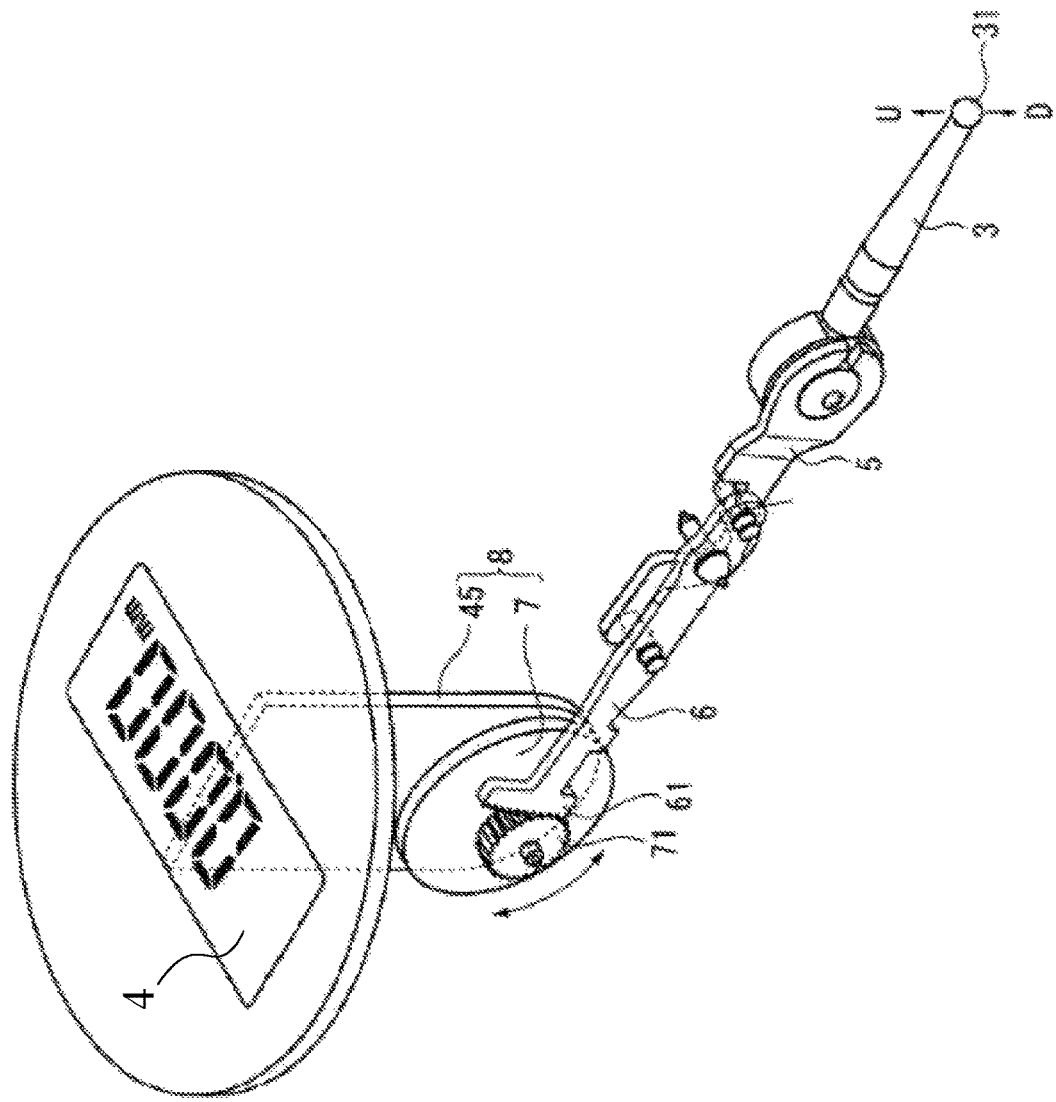
FIG. 4 is a perspective view partially illustrating an internal configuration of the test indicator.

FIG. 4 is a perspective view partially illustrating the internal configuration of the test indicator.

In the body case 1, a first arm 5, a second arm 6, a pinion 71, and a rotary encoder 8 are disposed. The first arm 5 is connected with the gauge head 3 so as to pivotally support the rotation axis of the gauge head 3. The second arm 6 is adjacent to the first arm 5 on the side opposite to the gauge head 3, and has a sector gear 61 at an end thereof. The pinion 71 engages with the sector gear 61. The rotary encoder 8 can detect a rotation amount of the pinion 71 as an electrical signal.

The rotary encoder 8 includes a rotor 7 and a stator 45, and is an absolute (ABS) type rotary encoder which detects an absolute angle within one rotation of the rotor 7.

Figure 5:
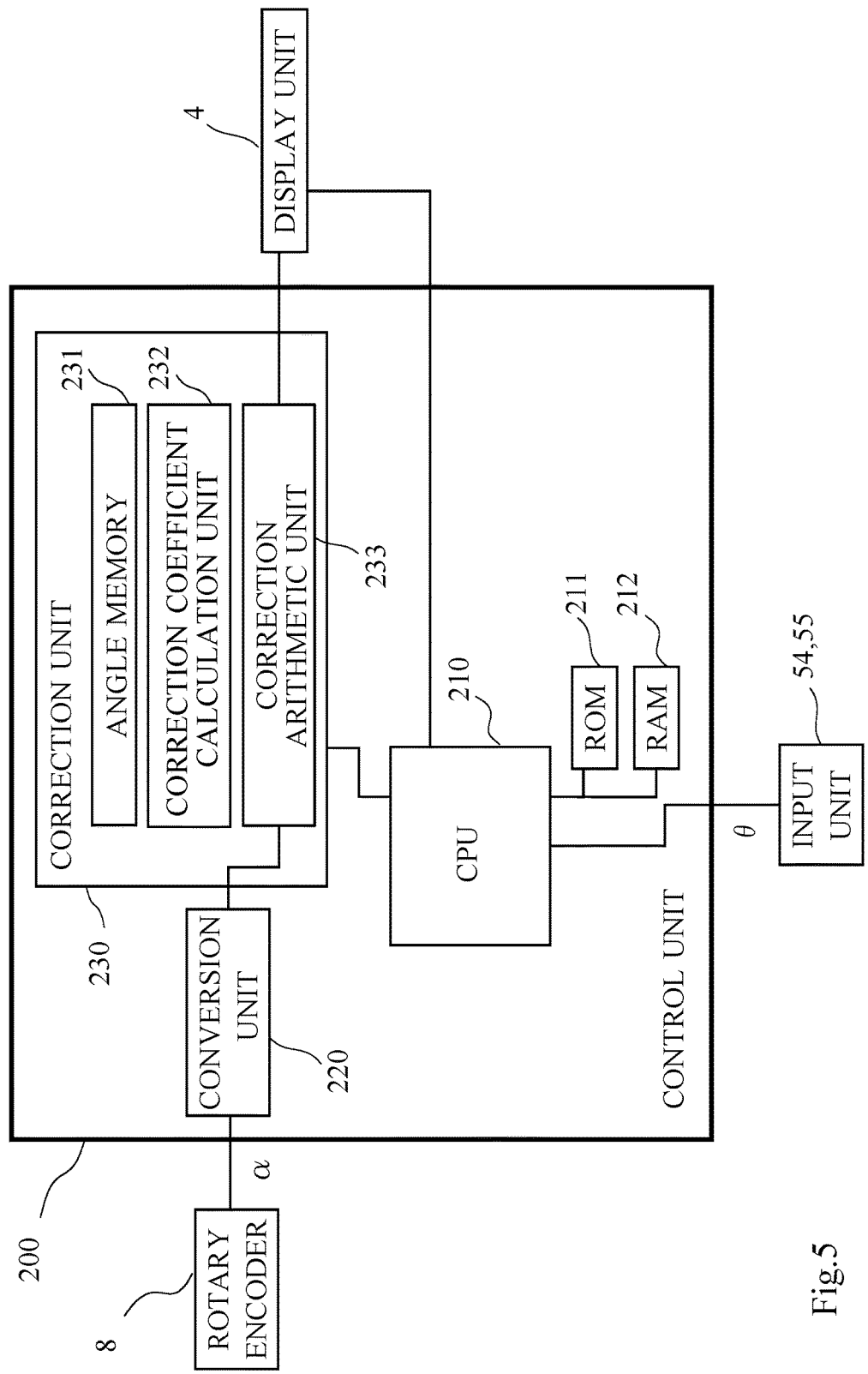
FIG. 5 is a functional block diagram for explaining a configuration of an internal control circuit.

Next, FIG. 5 is a functional block diagram for explaining an internal control circuit.

A control unit 200 includes a central processing unit (CPU) 210, a read only memory (ROM) 211 containing a predetermined control program, a random access memory (RAM) 212, a conversion unit 220, and a correction unit 230.

The conversion unit 220 converts a detection value (rotation displacement amount) α by the rotary encoder into a (straight line) displacement amount (L2) of the contact ball 31. Such conversion ratio is determined according to the length or the lever ratio of the gauge head 3.

The correction unit 230 corrects a measurement value according to the angle θ between a measurement target surface W and the gauge head 3.

The correction unit 230 includes an angle memory 231, a correction coefficient calculation unit 232, and a correction arithmetic unit 233.

The angle memory 231 stores the angle θ between the measurement target surface and the gauge head. To perform the measurement, a user inputs the angle θ between the measurement target surface W and the gauge head 3 using an input unit (the switches 54 and 55).

Figure 6:
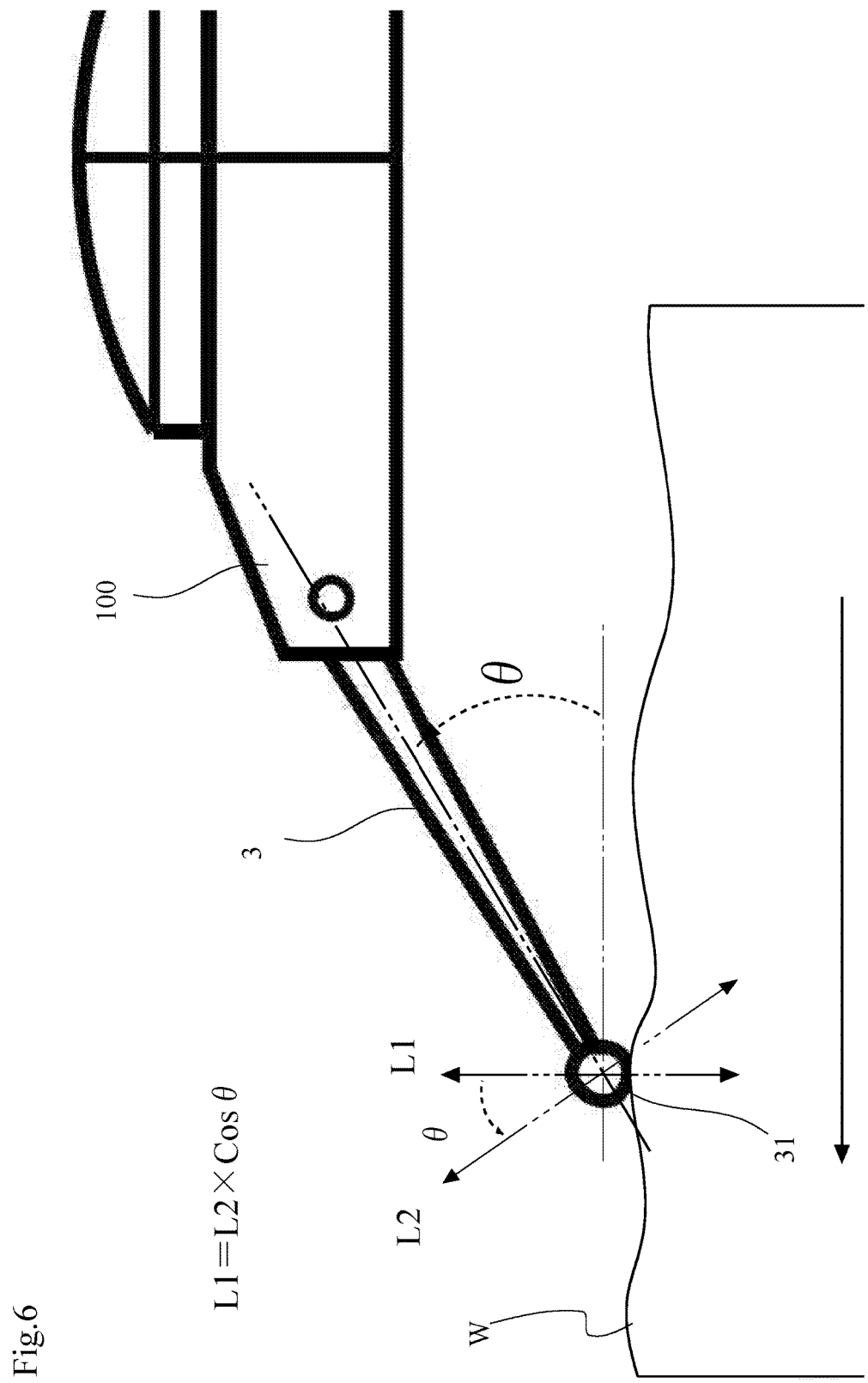
FIG. 6 is a diagram for explaining a correction coefficient.

The correction coefficient calculation unit 232 calculates a correction coefficient according to the angle θ. The correction coefficient is Cos θ. It is known from FIG. 6 that the relation between a displacement (L2) of the contact ball 31 and an unevenness amount (L1) of the measurement target surface W to be measured is L1=L2×Cos θ.

The correction arithmetic unit 233 multiplies, by the correction coefficient Cos θ, the (straight line) displacement amount (L2) of the contact ball 31 calculated by the conversion unit 220. Thus, the correct measurement value (L1) corrected according to the angle θ can be obtained. The corrected measurement value is displayed at the display unit 4.

In the above configuration, first, a user inputs, to the test indicator 100, the angle θ between the measurement target surface W and the gauge head 3 according to the installation position relation between the test indicator 100 and the measurement target surface W. The input angle θ is stored in the angle memory 231, and the correction coefficient (Cos θ) is calculated by the correction coefficient calculation unit 232. Then, the user brings the contact ball 31 of the gauge head 3 into contact with the measurement target surface W. Thus, the gauge head 3 is rotationally displaced according to the measurement target surface W. The rotation displacement of the gauge head 3 is converted into the rotation of the pinion 71 through the first and second arms 5 and 6, and the sector gear 61. The rotation amount of the pinion 71 is detected by the rotary encoder 8. The (straight line) displacement amount (L2) of the contact ball 31 is calculated by the conversion unit 220 based on the detection value (rotation displacement amount) α by the rotary encoder.

Then, the (straight line) displacement amount (L2) of the contact ball 31 is transmitted to the correction arithmetic unit 233 and multiplied by the correction coefficient (Cos θ) at the correction arithmetic unit 233. The corrected measurement value obtained in this manner is displayed at the display unit 4.

With the above configuration, the corrected measurement value is displayed at the display unit 4. The displayed value is simply the desired measurement value. Thus, the user is not required to separately correct the measurement value according to the angle θ in the conventional manner. Furthermore, it is possible to avoid a measurement error caused by forgetting the correction from occurring.

MODIFIED EXAMPLE 1

To perform measurement, it is preferable that a message prompting a user to input the angle is displayed. For example, a message, such as "Input the angle. Angle=?", can be displayed at the display unit 4 at a predetermined timing (for example, at a time when the power is ON). Thus, if the user forgets to correct the measurement value according to the angle θ between the measurement target surface W and the gauge head 3, it is possible to remind the user and lead to correct measurement.

MODIFIED EXAMPLE 2

When the measurement result is to be displayed, a measurement value before the correction and a measurement value after the correction may be displayed side by side. The measurement value before the correction is the displacement amount of the contact ball 31. The value is necessary to consider, for example, a measurement range.

MODIFIED EXAMPLE 3

Figure 7:
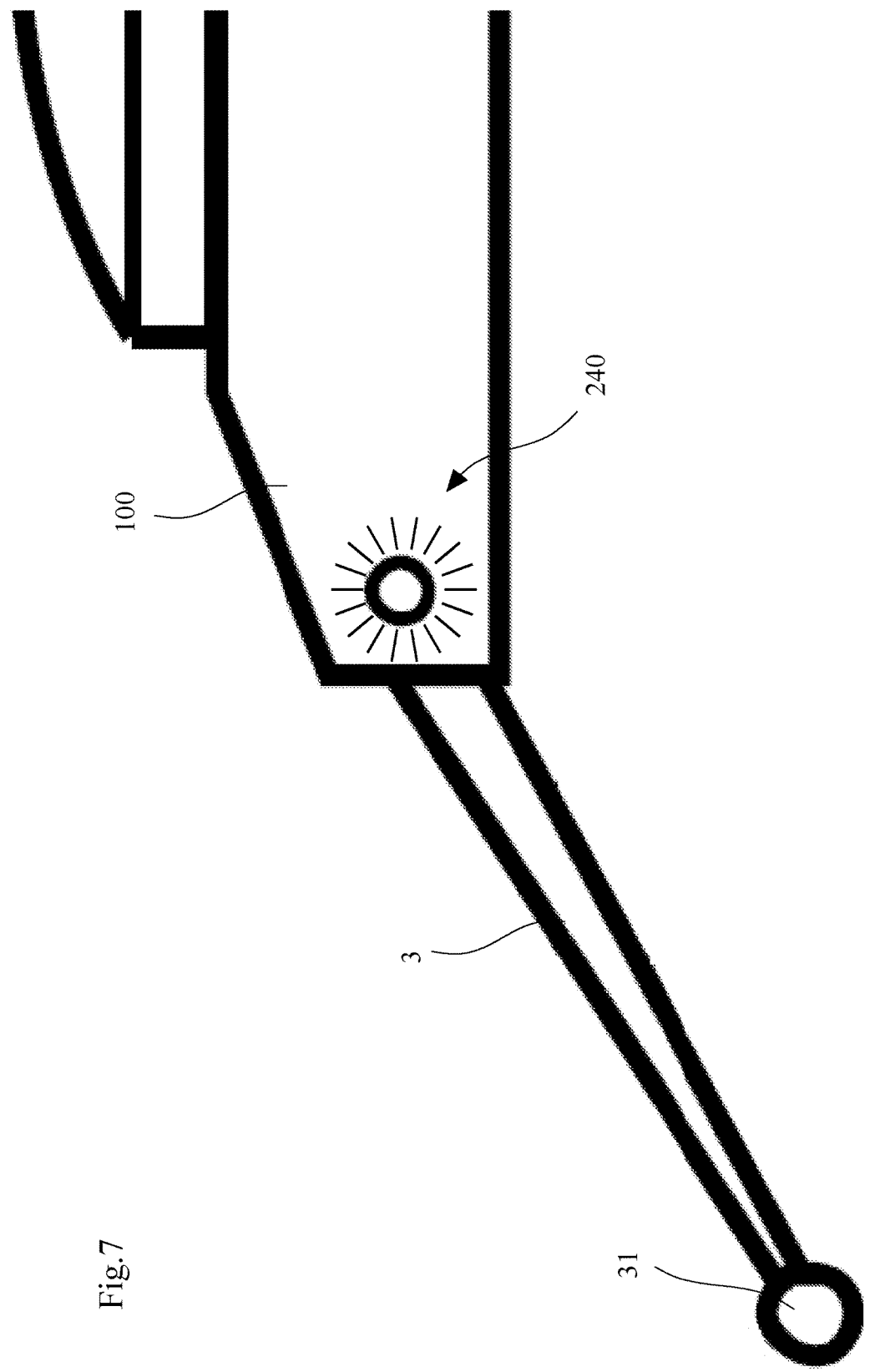
FIG. 7 is a diagram illustrating an example of an angle scale.

To easily obtain the angle θ between the measurement target surface W and the gauge head 3, an angle scale 240 which is an angle gauge (protractor) may be provided on a side surface of the test indicator 100. For example, the angle scale 240 may be provided around the rotation axis of the gauge head 3 on a side surface of the bearing (12 and 13) as illustrated in FIG. 7.

Note that, the present invention is not limited to the above exemplary embodiments, and a configuration appropriately modified without departing from the spirit belongs to the technical scope of the present invention.

What is claimed is:

1. A test indicator comprising:
a gauge head including a contact ball at a tip end;
a body case configured to pivotally support the gauge head;
a rotary encoder configured to detect a rotation displacement amount of the gauge head;
a display unit configured to display a measurement value based on a detection value by the rotary encoder; and
a correction unit including a processor configured to correct the measurement value according to an angle θ between a measurement target surface and the gauge head by receiving the angle θ, determining a correction coefficient based on a cosine of the angle θ, determining a displacement amount by converting the rotation displacement amount into a straight line, and multiplying the correction coefficient by the displacement amount.

2. The test indicator according to claim 1, wherein the correction unit further comprises:
an angle memory configured to store the angle θ between the measurement target surface and the gauge head and provide the angle θ to the processor.

3. The test indicator according to claim 1, wherein the display unit displays a message for a user to input the angle θ between the measurement target surface and the gauge head.

4. The test indicator according to claim 1, further comprising an angle scale provided around a rotation axis of the gauge head on a side surface of the test indicator.

* * * * *